United States Patent
La et al.

(10) Patent No.: US 8,029,752 B2
(45) Date of Patent: Oct. 4, 2011

(54) APPROACH IN CONTROLLING DSP SCALE IN BAYER PROCESS

(75) Inventors: Timothy La, Kardinya, WA (US); Ji Cui, Aurora, IL (US); John D. Kildea, Baldivis (AU); David H Slinkman, Lombard, IL (US); Kim Richard Coleman, Naperville, IL (US)

(73) Assignee: Nalco Company, Naperville, IL (US)

( * ) Notice: Subject to any disclaimer, the term of this patent is extended or adjusted under 35 U.S.C. 154(b) by 113 days.

(21) Appl. No.: 12/418,988

(22) Filed: Apr. 6, 2009

(65) Prior Publication Data

US 2010/0254866 A1    Oct. 7, 2010

(51) Int. Cl.
*C01B 33/26* (2006.01)

(52) U.S. Cl. .................................. 423/118.1

(58) Field of Classification Search .......... 423/111–137, 423/118.1
See application file for complete search history.

(56) References Cited

U.S. PATENT DOCUMENTS

| | | | |
|---|---|---|---|
| 5,118,484 | A | 6/1992 | The et al. |
| 5,314,626 | A | 5/1994 | Dimas |
| 5,415,782 | A | 5/1995 | Dimas |
| 5,650,072 | A | 7/1997 | McClain et al. |
| 6,569,908 | B2 | 5/2003 | Noguchi et al. |
| 6,808,768 | B2 | 10/2004 | Satou et al. |
| 6,814,873 | B2 | 11/2004 | Spitzer et al. |
| 2004/0011744 | A1 | 1/2004 | Spitzer et al. |
| 2004/0162406 | A1 | 8/2004 | Spitzer et al. |
| 2005/0010008 | A2 | 1/2005 | Spitzer et al. |
| 2005/0231436 | A1 | 10/2005 | McLean et al. |
| 2007/0178041 | A1 | 8/2007 | Tizon et al. |
| 2007/0231249 | A1 | 10/2007 | Batllo et al. |
| 2009/0008335 | A1 | 1/2009 | Flocken et al. |

FOREIGN PATENT DOCUMENTS

| | | |
|---|---|---|
| WO | WO 960643 A1 | 2/1996 |
| WO | WO 97/41065 | 11/1997 |
| WO | WO 97/41075 | 11/1997 |
| WO | WO 2006/003470 A1 | 1/2006 |
| WO | WO 2008/045677 A1 | 4/2008 |

OTHER PUBLICATIONS

Product Silica Control Options, by B. J. Robson, p. 87, *Light Metals* (1998).
A Novel Approach to Post-Desilicating Bayer Process Liquor, by K. I. The, p. 117, *Light Metals* (1998)
Max HT Sodalite Scale Inhibitor: Plant Experience and Impact on the Process, by Donald Spitzer et al., pp. 57-62, *Light Metals 2008* (2008).
*Performance Appraisal of Evaporation System with Scale Inhibitor Application in Alnorte Plant*, by A. Oliveir.

*Primary Examiner* — Wayne Langel
(74) *Attorney, Agent, or Firm* — Joshua D. Bishop; Michael M. Martin

(57) ABSTRACT

The invention provides a method of controlling silica in the liquor circuit of the Bayer process. The method involves addition of a promoter material to enhance the precipitation of DSP and includes adding one or more silica dispersion materials or dry silica forms to those parts of the circuit where precipitation of DSP and removal of silica from solution is desirable; for example the desilication stage of a Bayer process plant. The removal of DSP from solution reduces silica concentration in the liquor and thereby enables better control of process issues such as silica contamination in alumina product and DSP formation in later stages of the process where precipitation as scale onto vessel walls and equipment is problematical. As a result, the invention provides a significant reduction in the total cost of operating a Bayer process.

21 Claims, 10 Drawing Sheets

APPROACH IN CONTROLLING DSP SCALE IN BAYER PROCESS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to compositions of matter and methods of using them to treat various industrial process streams, in particular certain compositions that have been found to be particularly effective in promoting the formation of sodium aluminosilicate (also known as desilication product or DSP) in a Bayer process stream.

As described among other places in U.S. Pat. No. 6,814,873, the Bayer process is used to manufacture alumina from raw bauxite ore. Because the Bayer process uses caustic solution to extract alumina values from bauxite it is cost prohibitive to perpetually use fresh caustic solution. As a result, a caustic solution known as "liquor" and/or "spent liquor" is recycled back from later stages of the Bayer process to earlier stages and thus forms a fluid circuit. For the purposes of this application, this description defines the term "liquor". The recycling of liquor within the fluid circuit however has its own complexities.

Raw bauxite contains silica in various forms and amounts. Some of the silica is unreactive so it does not dissolve and remains as solid sand or mud within the Bayer circuit. Other silica (for example clays and kaolinite) is reactive and dissolves in caustic when added into Bayer process liquors. As spent liquor flows repeatedly through the liquor circuit of the Bayer process, the concentration of silica in the liquor increases eventually to a point where it precipitates, typically in conjunction with aluminum and soda to form insoluble sodium aluminosilicate. This material can precipitate as particulates in the liquor but is more often found as a hard scale on vessel walls in various parts of the Bayer process circuit. Aluminosilicate scale comes in at least two forms, sodalite and cancrinite. These and other forms of aluminosilicate scale are commonly referred to, and for purposes of this application define, the terms "desilication product" or "DSP".

DSP has been variously described, in some cases it is considered to have a formula of $3(Na_2O.Al_2O_3.2SiO_2).0-2 H_2O).2NaX$ where X represents $OH^-$, $Cl^-$, $CO_3^{2-}$, $SO_4^{2-}$. Because DSP has an inverse solubility (precipitation increases at higher temperatures) and can precipitate as scales of hard insoluble crystalline solids, the accumulation of silica in Bayer process liquor is problematic. Increased concentration of silica in solution leads to an increased propensity for precipitation of DSP. As solid DSP scale accumulates in Bayer process pipes, vessels, heat transfer equipment, and other process equipment, it forms flow bottlenecks and obstructions and can adversely affect liquor throughput. Because of its thermal conductivity properties, DSP scales on heat exchange also reduce the heat exchange efficiency. In addition, poor control of silica in solution can also affect the quality of the final alumina trihydrate product resulting in $SiO_2$ contaminated alumina.

These adverse effects require plants to operate a range of control measures to mitigate the impact of silica dissolution on the functioning of the process. In terms of scale formation, one of the key issues is the significant downtime of Bayer process equipment that is required. Equipment is typically taken off-line as part of a routine descaling operation to remove scale buildup. In addition, DSP is difficult to remove and de-scaling requires the use of hazardous concentrated acids such as sulfuric acid.

Additionally, plants typically also incorporate a "desilication" step in the Bayer process. This step provides a controlled exit of silicate from the circuit (in the form of "free" DSP solids) and thereby mitigates the buildup of silica in solution. The desilication step is normally conducted prior to the digestion stage and removes some of the silica from the Bayer process liquids. Typically desilication is a process that involves maintaining Bayer slurry under conditions of temperature and holding time that are conducive to the precipitation of silica from solution in the form of sodalite (DSP) particles. Solid particles of sodalite that are formed under such conditions can then be removed from the process along with other insolubles (sand, mud) in the existing solid-liquid separation processes downstream. Conditions are typically arranged to minimize both the formation and impact of any DSP that may form as scale.

Some examples of desilication steps are described in international published applications WO 1996/006043, and WO 2006/003470, and published articles *Product Silica Control Options*, by B. J. Robson, Page 87, *Light Metals*, (1998), and *A Novel Approach to Post-Desilicating Bayer Process Liquor*, by K. I. The, Page 117, *Light Metals*, (1998). The efficient operation and removal of silica in the desilication process is a key process that plant operators use to control silica in solution. In this way, operators are able to mitigate the adverse impacts of high silica concentration, including product contamination and DSP scale formation. Such desilication steps however, are expensive and are not effective in removing all silica from solution. As a result, substantial quantities of dissolved silica typically pass on to subsequent Bayer process steps and so potential for DSP scale formation and product contamination remains. As a result, several other strategies have been suggested to control DSP scale in the Bayer process.

Another strategy is to reduce DSP scale in the Bayer process through the use of a DSP inhibitor. DSP inhibitors prevent the formation of DSP scale on Bayer process equipment, by inhibiting DSP precipitation and/or altering DSP morphology so it does not adhere to the equipment. Some examples of inhibitors are described in U.S. patent application Ser. No. 12/236946, U.S. Pat. No. 6,814,873 B2, US published applications 2004/0162406 A1, 2004/0011744 A1, 2005/0010008 A2, international published applications WO 2008/045677, WO 1997/041075, and WO 1997/041065, and published articles *Max HT™ Sodalite Scale Inhibitor: Plant Experience and Impact on the Process*, by Donald Spitzer et. al., Pages 57-62, *Light Metals* 2008, (2008) and *Performance Appraisal of Evaporation System with Scale Inhibitor Application in Alnorte Plant*, by A. Oliveira et al., Pages 133-136, *Light Metals* 2008, (2008). All of these attempts however involve tolerating the presence of silica in the Bayer process fluid circuit and compensating for the effects of the silica.

Another alternative strategy for addressing DSP scale is to enhance the removal of the silica upstream in the Bayer process. Increasing the mass of silica removed can result in a reduction of the concentration of silica in solution in subsequent, downstream processes. Such a result is likely to have some impact on DSP scale formation, and may also impact on product quality issues such as silica in alumina product.

Thus there is clear need and utility for an improved method of enhancing the removal of dissolved silica from Bayer process liquor in a controlled manner. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment of the invention is directed towards a method for enhancing the precipitation of silica from Bayer process liquor comprising the step of: adding to a Bayer liquor a DSP promoter, precipitating sodalite, and removing the sodalite from the Bayer liquor. The promoter is a composition of matter comprising at least one silica dispersion. The promoter may be added to the desilication step of a Bayer process. The promoter may be selected from the list consisting of: colloidal silica, borosilicate, silica sol, fumed silica, organo-silica sol, acidic-silica sol, sodium silicates, a silicon oxide derivative, and any combination thereof. The promoter may be blended with a DSP inhibitor.

At least one embodiment of the invention is directed towards a method in which the promoter has a particle size of between 2 nm and 200 nm. The dosage of the promoter in the Bayer liquor may be between 1 and 10,000 ppm. After the promoter is added to the Bayer liquor, the Bayer liquor may be prevented from proceeding to a subsequent stage of the Bayer process for no more than 8 hours. A seed solid may also be added to the Bayer liquor. The seed solid may be un-dissolved DSP.

At least one embodiment is directed towards a method in which the promoter is doped with at least one item selected from the list consisting of: boron, organic compounds, iron, titanium, zirconium or aluminium. The promoter may be sodium based. The promoter may be a boron-doped sodium borosilicate with a particle size on the order of 4 nm. The promoter may be stabilized by lithium, potassium, and any combination thereof.

BRIEF DESCRIPTION OF THE DRAWINGS

A detailed description of the invention is hereafter described with specific reference being made to the drawings in which.

DETAILED DESCRIPTION OF THE INVENTION

For purposes of this application the definition of these terms is as follows:

"Alumina Process Medium" means one or more materials present in an alumina refining process which includes but is not limited to liquor, spent liquor, pregnant liquor, slurry, digester slurry, Bayer liquor, bauxite, recycled liquor, scale, aluminum containing ore, and any combination thereof.

"Dispersion" means a fluid system comprising a solid or fluid dispersed phase, which is substantially dispersed within a fluid dispersion medium, dispersion includes but is not limited to suspensions and colloids.

"Dry Silica" means a collection of fine size amorphous, non-porous, and/or spherical silica particles (with or without metal doping and/or organic group incorporation) in a dry form.

"Foulant" means a material deposit that accumulates on equipment during the operation of a manufacturing and/or chemical process which may be unwanted and which may impair the cost and/or efficiency of the process. DSP is a type of foulant. Other types of foulant include but are not limited to: gibbsite scale which accumulates at cooler portions of the Bayer process circuit, boehmite which accumulates in the Digester vessels and pipes of the Bayer process, oxalate, and combinations of one, some, or all of these types.

"Plant Liquor" or "Bayer Liquor" is actual liquor that has run through a Bayer process in an industrial facility.

"Pozzolanic silicas" means silica compounds that react in a high pH environment to form polymeric silica. Some examples of pozzolanic silicas are fly ash, volcanic ash, rice hull ash, perlite, diatomaceous earth, microcrystalline silica (such as Imsil of Unimin Corporation, New Canaan, Conn.) and microsilica.

"Promoter" means a composition of matter that improves the removal of silica from an environment, promoters include some silica dispersions and some dry forms of silica.

"Silica Dispersion" means a stable or unstable dispersion of fine size amorphous, non-porous, and/or spherical silica particles (with or without metal doping and/or organic group incorporation) in a liquid phase.

"Silica fume" means a low purity inexpensive silicon-bearing by-product of silicon and ferrosilicon production.

"Synthetic Liquor" or "Synthetic Spent Liquor" is a laboratory created liquid used for experimentation whose composition in respect to alumina, soda, and caustic corresponds with the liquor produced by recycling through the Bayer process.

In the event that the above definitions or a definition stated elsewhere in this application is inconsistent with a meaning (explicit or implicit) which is commonly used, in a dictionary, or stated in a source incorporated by reference into this application, the application and the claim terms in particular are understood to be construed according to the definition in this application, and not according to the common definition, dictionary definition, or the definition that was incorporated by reference.

Figure 1:
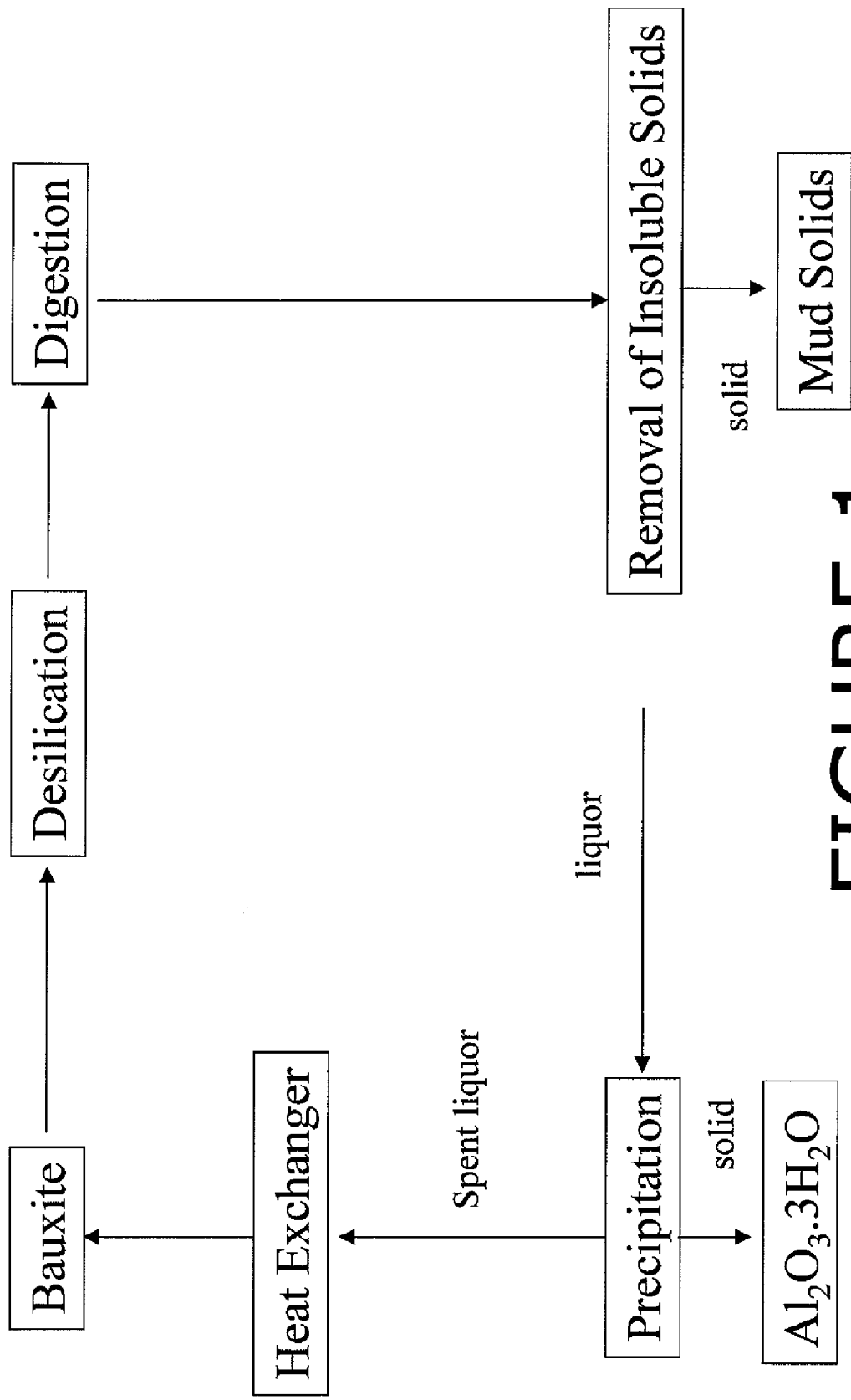
FIG. 1 is a flowchart of at least a portion of a typical Bayer type process operation.

Referring now to FIG. 1 there is shown a flowchart illustrating at least a portion of a Bayer process for manufacturing alumina from raw bauxite ore. Raw bauxite ore, which contains silica in various forms passes through a grinding stage and alumina together with some impurities including silica are dissolved in the added liquor. Some solids remain undissolved such that the resultant output from the grinding stage is a slurry. During the grinding stage significant amounts of the reactive silica present in raw bauxite ore becomes dissolved in the slurry.

In prior art processes, the slurry then passes through a desilication stage where the holding conditions induce much of the dissolved silica to precipitate as DSP, thus reducing the amount of silica in solution. The slurry is passed on to a digestion stage where more of the remaining solid reactive silica dissolves. The liquor is later separated from undissolved solids and alumina is recovered by precipitation as gibbsite. The spent Bayer liquor completes its circuit as it passes through a heat exchanger and back into the grinding stage. DSP scale accumulates throughout the Bayer process but particularly at the digestion stage and most particularly at or near the heat exchangers that recycled liquor repeatedly passes through.

In at least one embodiment, a promoter compound is added to the slurry in the desilication stage. The promoter enhances the formation of solid sodalite in the bauxite slurry. This process increases the removal of silica from solution and thereby enhances the performance of the desilication process. In at least one embodiment, the promoter is silica dispersion such as colloidal silica. In at least one embodiment the silica dispersion or dry form silica is selected from the list consisting of: borosilicate, silica sol, fumed silica, silica fume, organo-silica sol, sodium silicates, boron doped colloidal silica, pozzolans, pozzolanic silicas, precipitated silica, polysilicates, silicilic acid, potassium silicates, high surface area dried agglomerated silica, aluminasilicates, metal oxide silicates, sodium silicates, partially neutralized sodium silicates, partially neutralized silicilic acid, TEOS, amorphous silica agglomerated particles, siloxane modified silica, and any combination thereof. In at least one embodiment the promoter is microcrystalline silica with a size as low as 100 nm. In at least one embodiment the promoter is doped with sodium aliminate stabilizer (such as Ludox AM, by DuPont), Al, Ti, V, Fe, Cu, Ni, Cr, B, Zr, and Ce. In at least one embodiment the promoter is a reactive silica. In at least one embodiment the promoter is a silicon oxide derivative. In at least one embodiment the promoter is one of the compositions of matter disclosed in U.S. Pat. Nos. 6,569,908, 6,808,768, and published US patent applications 2007/0231249 and 2005/0234136.

In at least one embodiment the promoter is doped with a metal. The metal can include any suitable material and be derived from any suitable material including metal salts that are soluble or substantially soluble in an aqueous solution. In at least one embodiment, the metal includes an alkali metal, an alkaline earth metal, a 1st row transition metal, a 2nd row transition metal, a lanthanide, and combinations thereof. Preferred metal components include aluminum, cerium, titanium, tin, zirconium, zinc, copper, nickel, molybdenum, iron, rhenium, vanadium, boron, the like and any combination thereof.

In at least one embodiment the promoter comprises a metal component and a stabilizing component to form a colloid of silica particles. Examples of such stabilizers are an amine or quaternary compound. Nonlimiting examples of amines suitable for use as the stabilizer include dipropylamine, trimethylamine, triethylmine, tri-n-propylamine, diethanolamine, monoethanolamine, triethanolamine, diisobutylamine, isopropylamine, diisopropylamine, dimethylamine, ethylenediaminetetraacetic acid, pyridine, the like and combinations thereof. Preferably, the stabilizing component is a quaternary amine that forms an alkaline solution when dispersed in water, such as quaternary ammonium hydroxides. In addition, it is further preferred that the quaternary amine includes a tetraalkyl ammonium ion wherein each alkyl group has a carbon chain length of 1 to 10, the alkyl groups being the same or different. Nonlimiting examples of quaternary amines suitable for use as the stabilizer include tetramethylammonium hydroxide (TMAOH), tetrapropylammonium hydroxide (TPAOH), tetraethylammonium hydroxide (TEAOH), tetrabutylammonium hydroxide (TBAOH), tetrahexylammonium hydroxide, tetraoctylammonium hydroxide, tributylmethylammonium hydroxide, triethylmethylammonium hydroxide, trimethylphenylammonium hydroxide, methyltripropylammonium hydroxide, dodecyltrimethylammonium hydroxide, hexadecyltrimethylammonium hydroxide, dimethyldodecylethylammonium hydroxide, diethyldimethylammonium hydroxide, the like and combinations thereof. Also, the bromide and chloride forms of the above mentioned ammonium salts can be used by passing through a hydroxide (anion)-exchange column to produce the alkylammonium hydroxide materials.

The following examples are presented to describe embodiments and utilities of the invention and are not meant to limit the invention unless otherwise stated in the claims.

EXAMPLES

Method

Polypropylene bottles and a temperature controlled rotary water bath were used for the isothermal, batch desilication experiments. Bauxite slurry from the plant grinding mills and plant spent Bayer liquor were tested.

Method A: Bauxite Slurry Test

Bauxite slurry was collected from a plant and samples (approximately 200 mL) were added into a series of 250 mL polypropylene bottles. These samples were then variously dosed with colloidal silica product (dosed at 0, 500 and 1000 ppm) with duplicate samples for each dose rate being employed. The samples were then placed in a rotating water bath with temperature held at 95° C. throughout the duration of the test (6 hours). Sub-samples of the slurries were collected from each bottle at regular intervals and a small sample of clean liquor was separated from the solids. The silica concentration in each liquor sample was determined by ICP. For undosed (control) samples, the reduction in concentration of $SiO_2$ in solution over the course of the experiment is indicative of the formation of solid DSP and mimics the typical plant operation of the desilication stage. Changes in concentration from the undosed control samples indicate the impact of the promoter.

Method B: Plant Spent Liquor Test

A series of tests were carried out using plant spent liquor. Samples of spent liquor (200 mL) were placed into 250 mL polypropylene bottles and then a concentrated solution of sodium silicate was added such that ~1 g/L of $SiO_2$ was added to each bottle. This increase in the silicate concentration in solution was designed to promote DSP formation over the test period. Samples were additionally dosed with promoter products (dosed at 0, 50, and 100 ppm). The resulting samples were then heated in a rotating water bath with temperature held constant at 95° C. throughout the duration of the test (4 hours). After 4 hours of heating, substantial solid material had precipitated in all samples. These mixtures were filtered to collect DSP solids, which were washed with hot de-ionized water and air-dried overnight. The effectiveness of the promoters was determined by comparing the mass of the DSP solid obtained to that of the undosed control samples. Changes in the mass of material precipitated in dosed samples (when compared to undosed control samples) indicate the impact of the addition of the promoter. The reagents used in the testing are described in Table 1.

TABLE 1

| Product | Chemistry/Type | Details |
| --- | --- | --- |
| A | Colloidal silica | Sodium based, particle size ~4 nm |
| B | Colloidal silica | Boron-doped with sodium borosilicate, particle size ~4 nm |
| C | Silica sol | Lithium based, particle size 5-35 nm |
| D | Colloidal silica | Potassium based, particle size 8-90 nm |
| E | Colloidal silica | Acidic silica sol, particle size ~20 nm |
| F | Fumed silica | Commercial available, particle size 4-6 nm, |
| G | Organosilica sol | Epoxy modified silica sol, Particle size 20-50 nm |
| H | Silica sol | Sodium based, particle size 13-16 nm |
| I | Silica sol | Sodium based, particle size 20 nm |
| J | Colloidal silica | Sodium based, particle size 35-70 nm |
| K | Colloidal silica | Sodium based, particle size >70 nm |
| L | Organosilica sol | Deionized silica sol stabilized with ~8 wt % piperazine and 3 wt % tetramethylammonium hydroxide, particle size 50-70 nm |
| M | Colloidal silica | Aluminum doped, particle size ~ 6 nm |

Results

Using Method A, separate tests were conducted using bauxite slurry from different alumina refineries. The reduction in $SiO_2$ concentration in the liquor indicates the formation of DSP solid. The results obtained from the sample tested were compared with that of the undosed control sample based on the changes in concentration of silica in solution (as measured by ICP) over the course of the test period.

Figure 2:
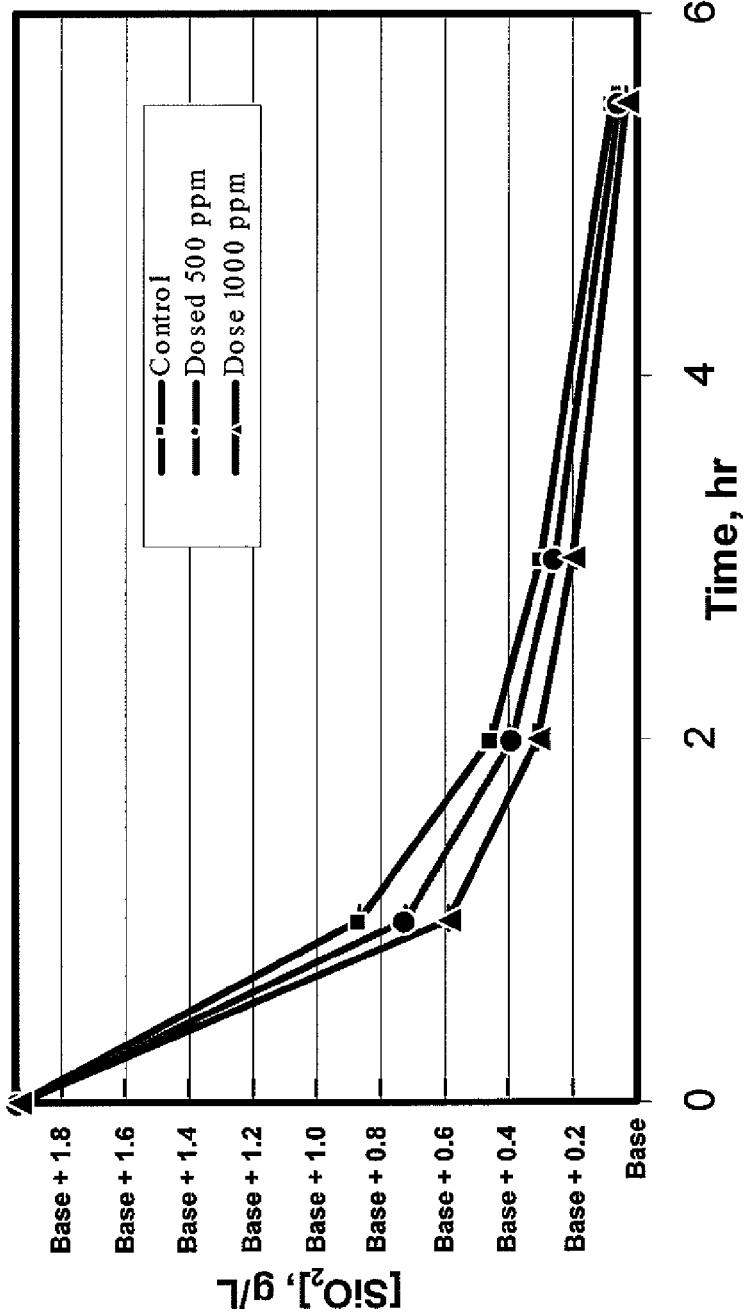
FIG. 2 is a silica concentration versus time curve obtained from the bauxite slurry from an alumina refinery.
Figure 3:
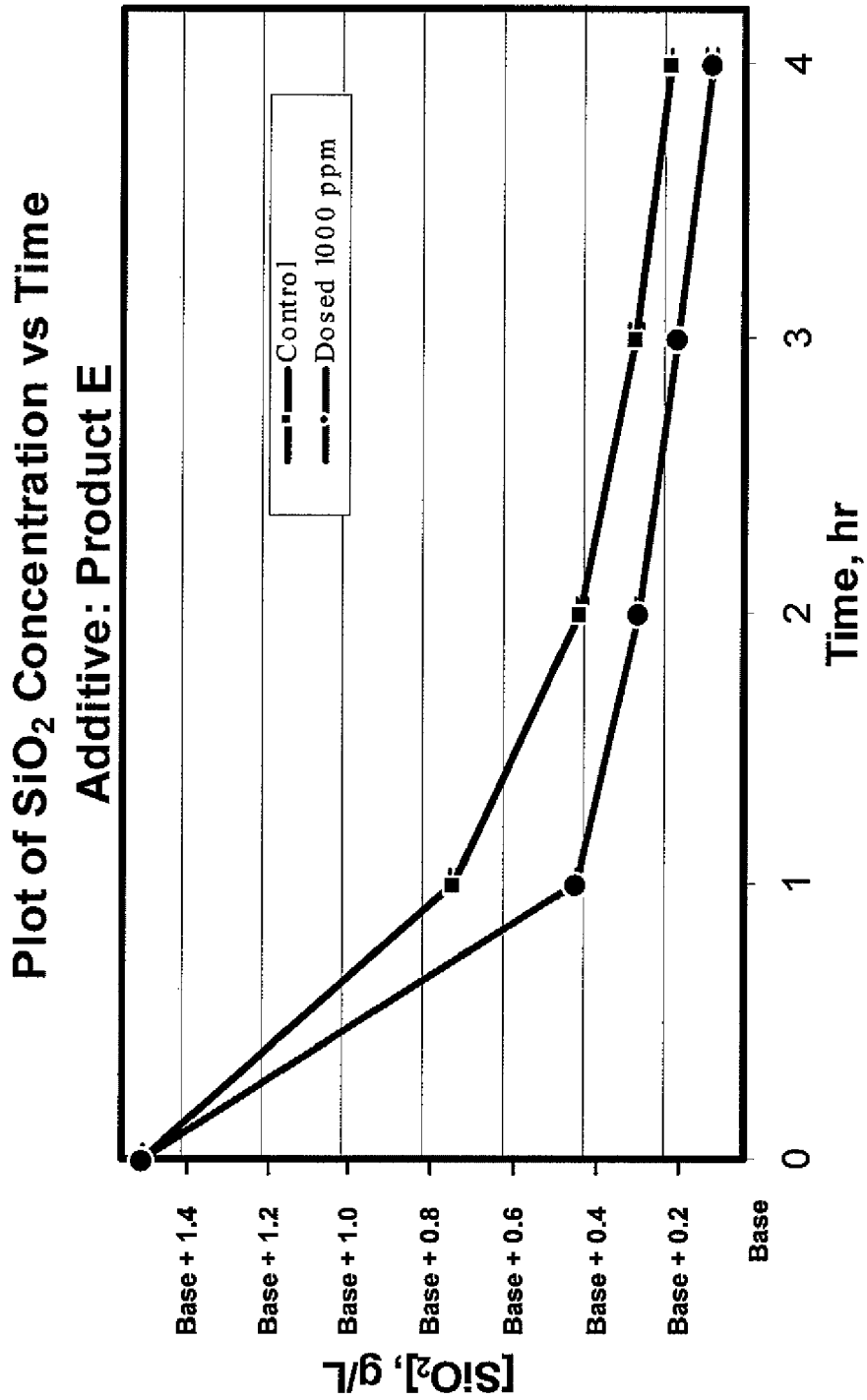
FIG. 3 is a silica concentration versus time curve obtained from the bauxite slurry from another alumina refinery.
Figure 4:
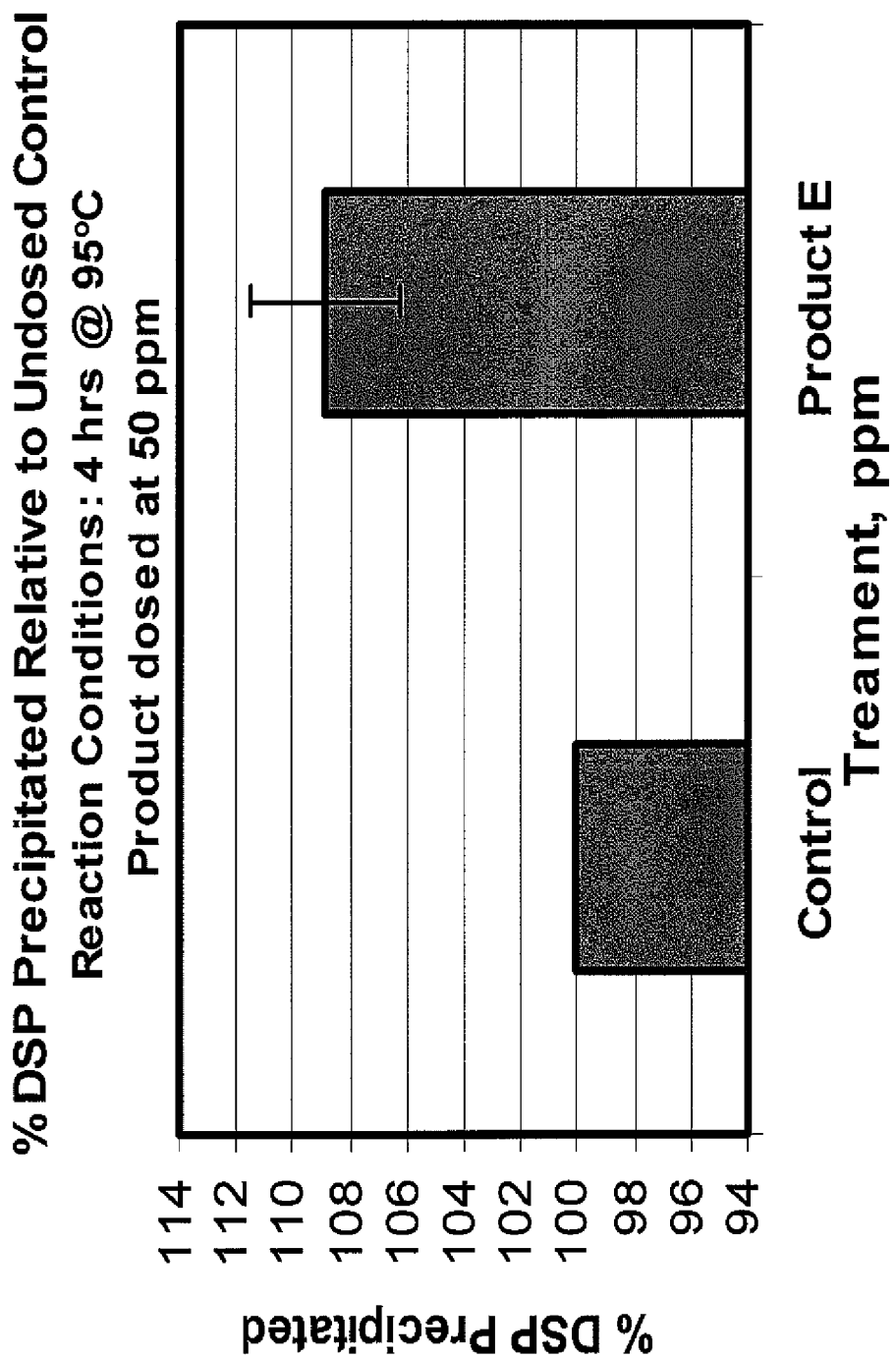
FIG. 4 is a graph comparing the percent of DSP mass precipitated relative to an undosed control sample using spent liquor.
Figure 5:
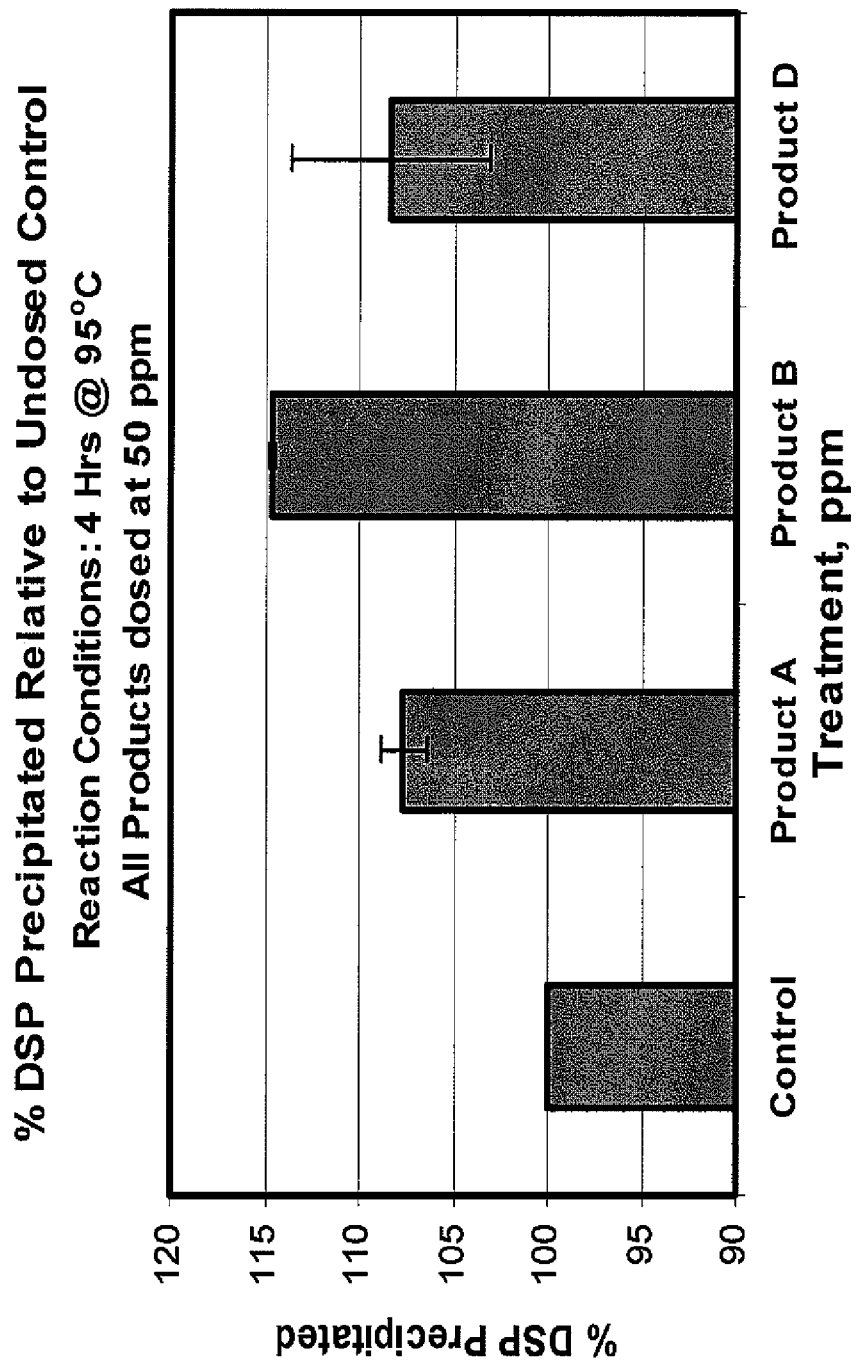
FIG. 5 is a graph of the percent of DSP mass precipitated relative to an undosed control sample in spent liquor.
Figure 6:
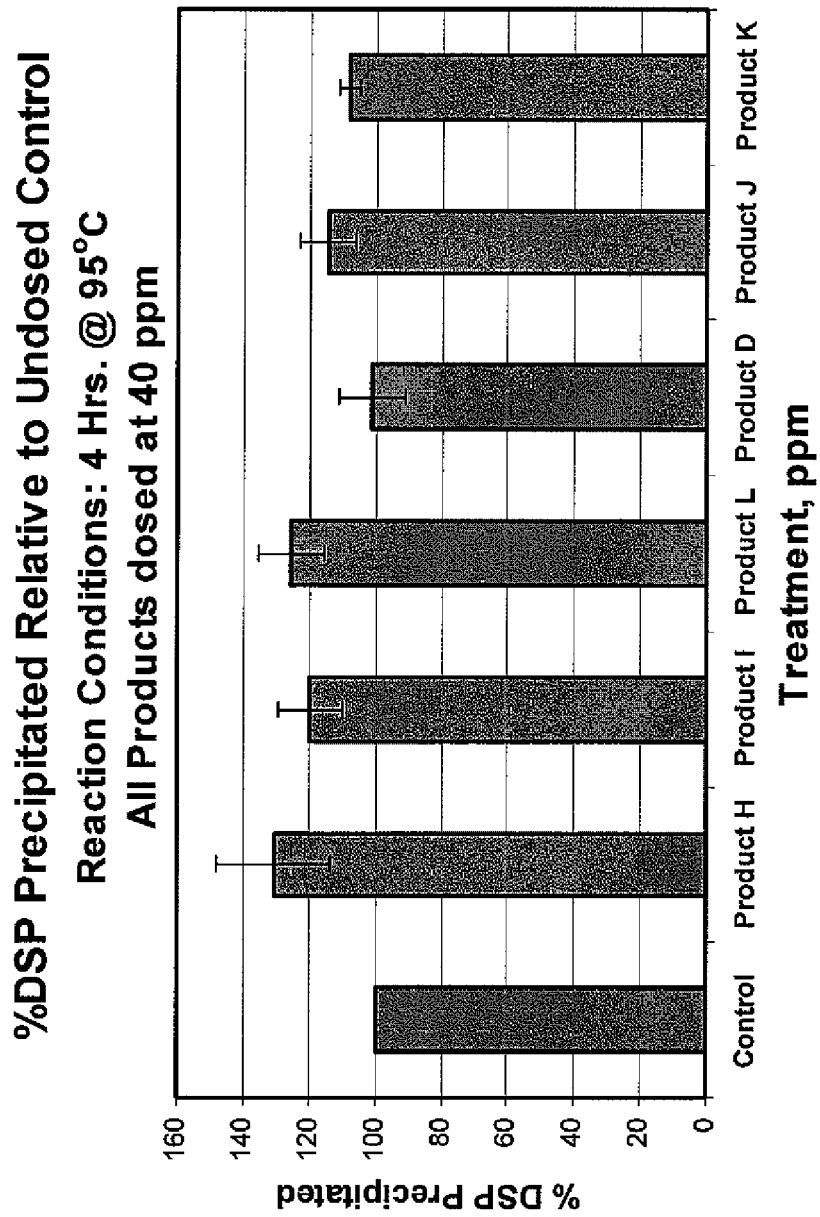
FIG. 6 is a graph of the percent of DSP mass precipitated relative to an undosed control sample in spent liquor.
Figure 7:
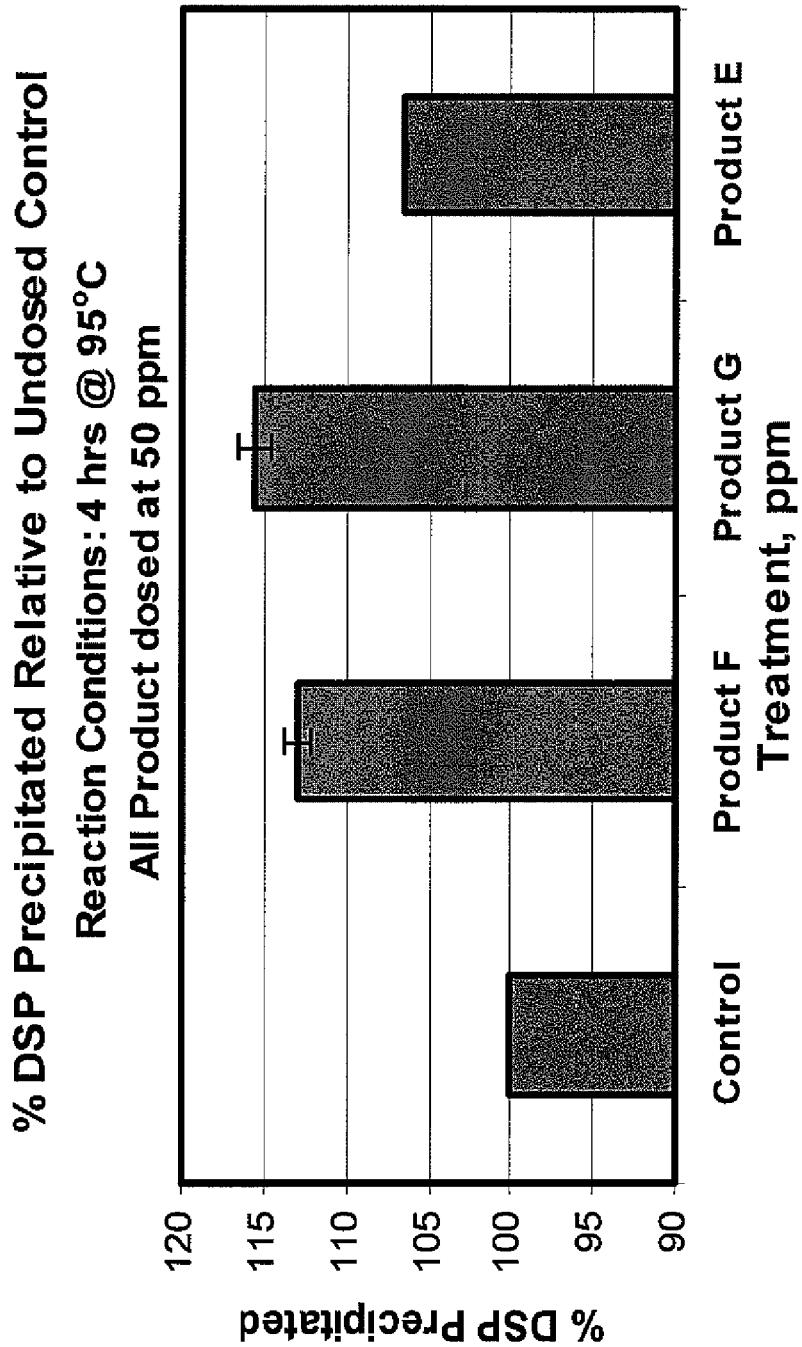
FIG. 7 is a graph of the percent of DSP mass precipitated relative to an undosed control sample in spent liquor.
Figure 8:
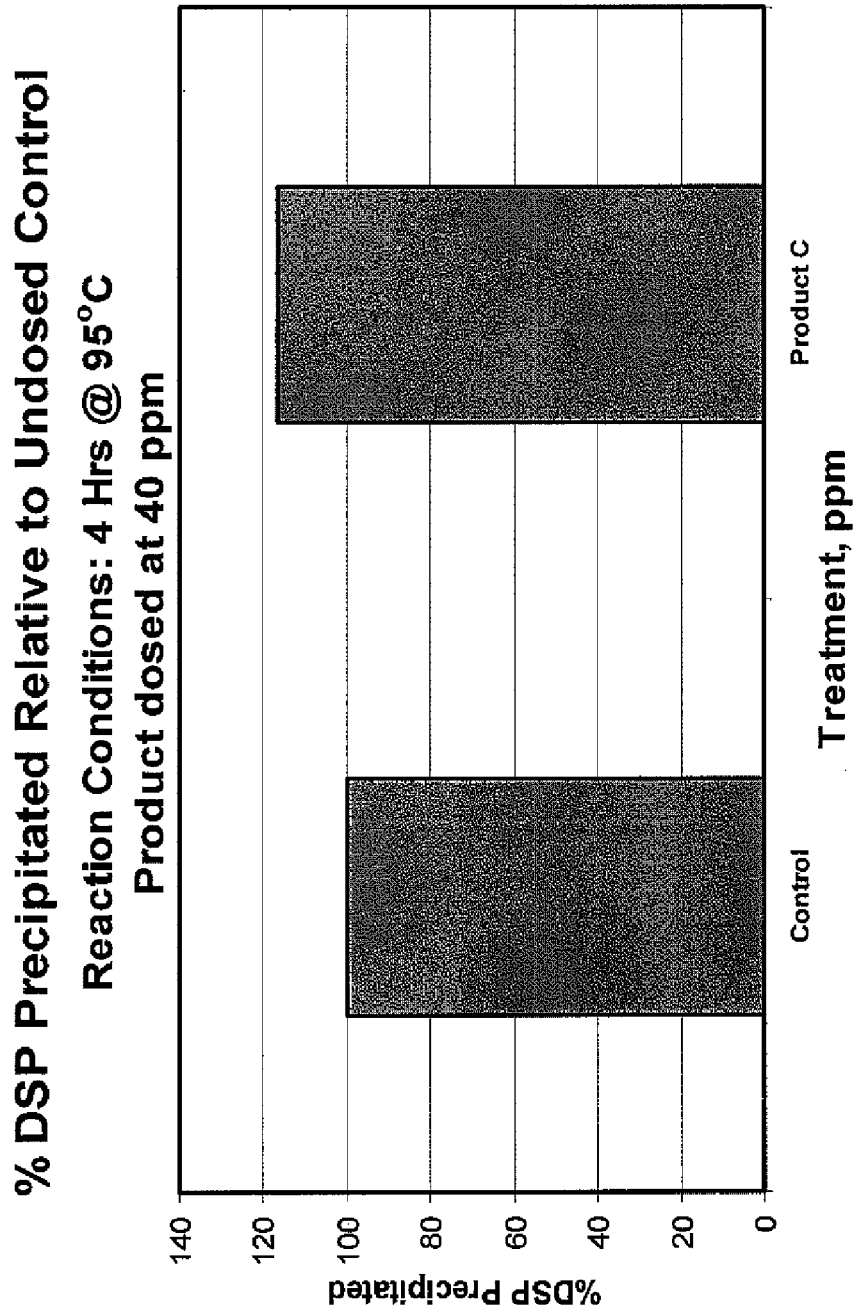
FIG. 8 is a graph of the percent of DSP mass precipitated relative to an undosed control sample in spent liquor.

The results are summarized in FIGS. 2 and 3. FIG. 2 shows the silica concentration versus time curve obtained from the bauxite slurry from a bauxite processing facility. Three different treatment regimes are shown; undosed control samples and samples dosed with product E at two different concentrations, 500 and 1000 ppm respectively. The addition of product E enhances the DSP formation with respect to that of the control (without additive). FIG. 3 shows a similar silica concentration versus time curve obtained in a test using bauxite slurry from another bauxite processing facility. In this test, the product E dosed at ~1000 ppm again effectively enhances the precipitation of silica from solution.

Results of the tests on plant spent liquor (Method B) from a variety of refineries using a range of products are similar to that found using Method A, i.e., the precipitation of silica from solution and the formation of DSP solids was enhanced by the addition of promoter product. These results are illustrated in FIGS. 4, 5, 6, 7 and 8 respectively.

While the above examples show the use of silica based materials to enhance precipitation of silica from solution, the magnitude of the impact in the above examples is surprising. Prior art methods do disclose using DSP solids to enhance DSP formation (see: *Product Silica Control Options*, by B. J. Robson, Page 87, *Light Metals*, (1998) but never to the degree and extent shown in samples A-L.

Figure 9:
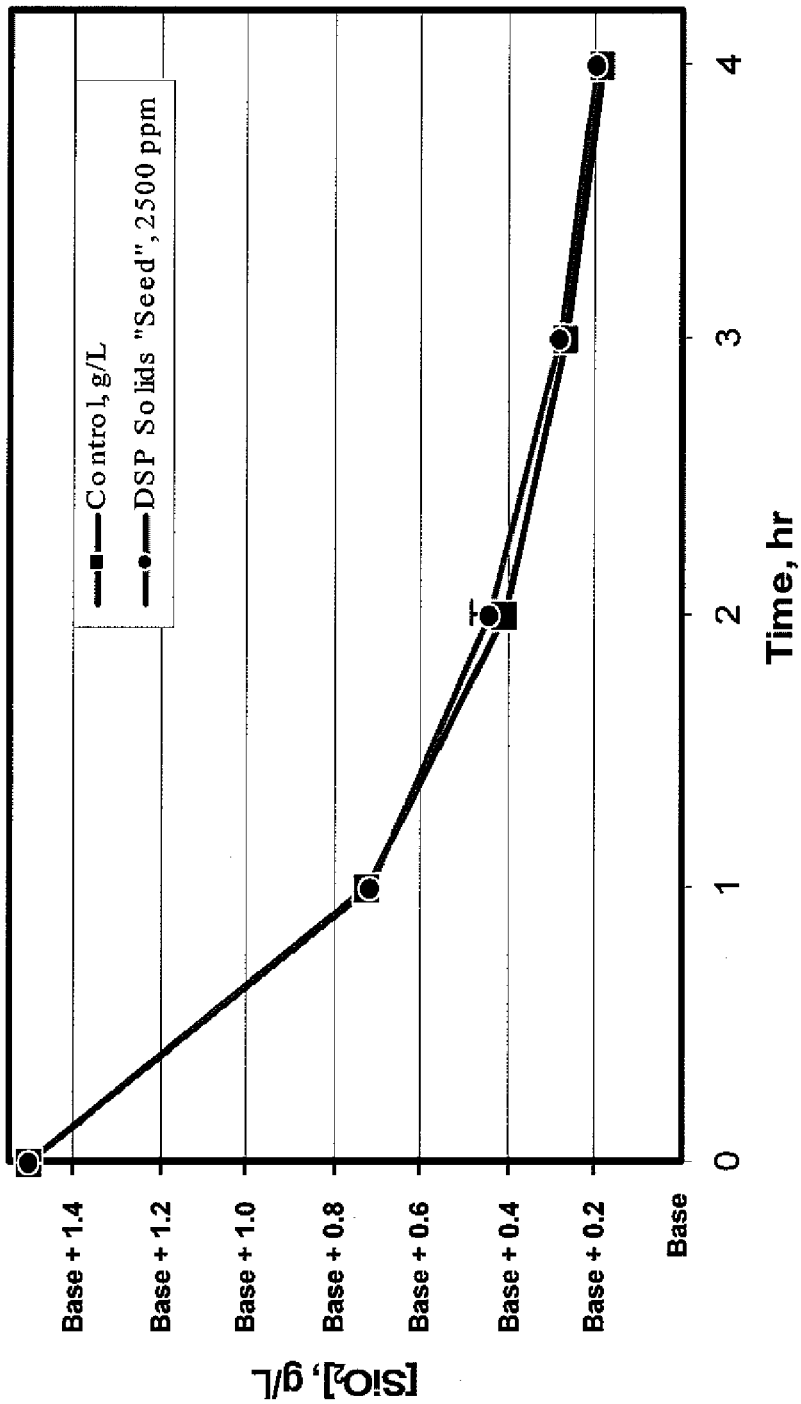
FIG. 9 is a silica concentration versus time curve obtained from the bauxite slurry from an alumina refinery.

Addition of DSP solids to enhance the precipitation process has been further assessed using test Method A. Using doses of 2500 ppm of DSP solids (well in excess of the doses used for the promoter samples in the above examples) the impact upon DSP precipitation was determined. The resultant silica concentration in liquor over time for a slurry sample dosed with 2500 ppm of DSP solids is compared to an undosed control sample in FIG. 9. The results show no significant change in the concentration of silica between the two treatments, indicating that the use of DSP solid as a seed source to enhance the precipitation is ineffective at this dose. By contrast, the results from addition of samples A-L show significant enhancement of DSP precipitation, even at significantly lower doses. Note that the DSP solids used in this test were generated from undosed control samples in tests using Method B. (i.e. DSP solids precipitated from liquor).

Figure 10:
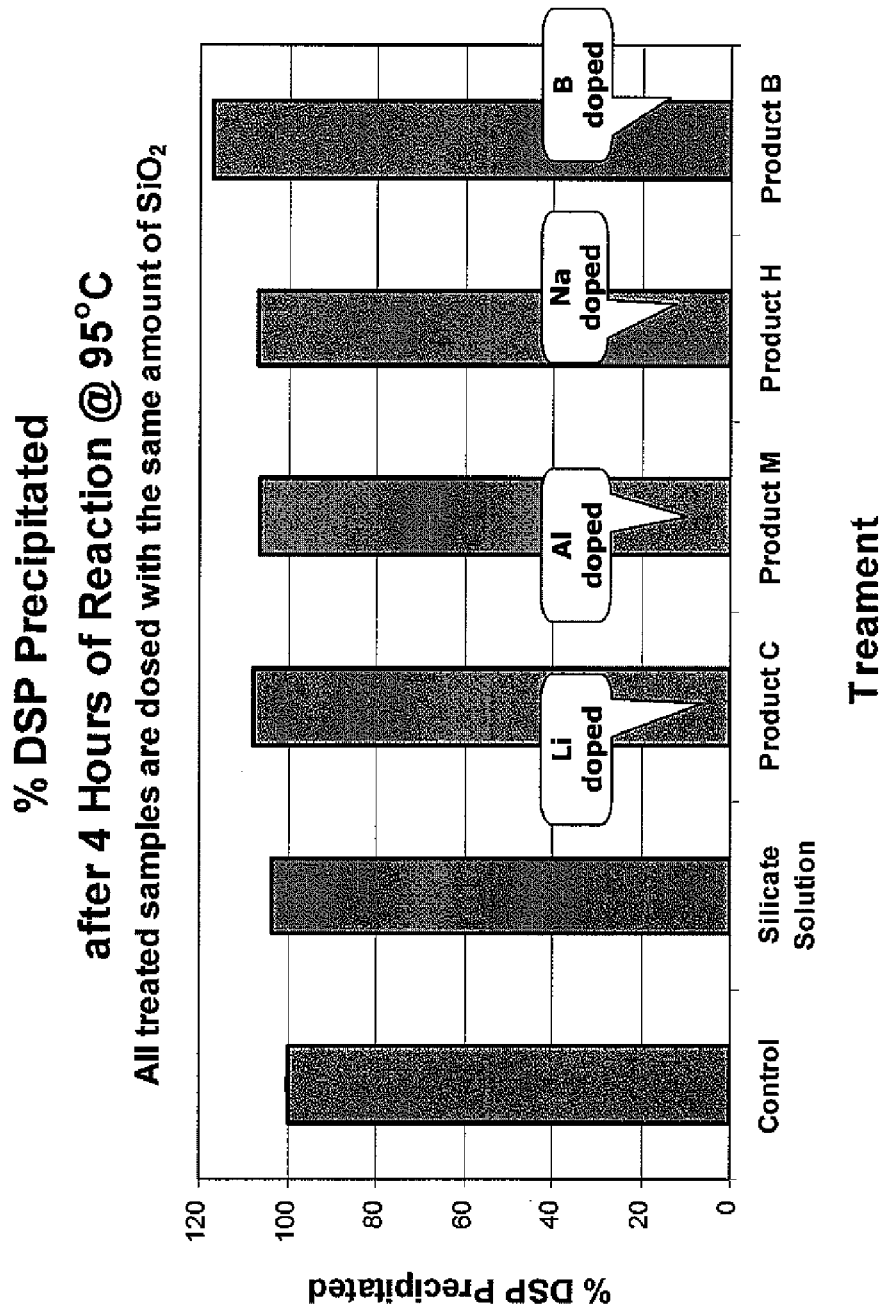
FIG. 10 is a graph of the percent of DSP mass precipitated relative to dosed samples in spent liquor.

In addition to the colloidal silica and borosilicate products, as shown in FIG. 10, a range of modified product blends are encompassed by this invention, including but not limited to colloidal silicas stabilized with lithium or potassium and those doped with various concentrations of organic compounds, iron, titanium, zirconium, aluminum, and any combination thereof. In all cases the colloidal silica/borosilicate is the predominant component indicating that the colloidal silica/borosilicate alone, as well as in such blends has the desired impact of enhanced DSP precipitation.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. All patents, patent applications, scientific papers, and other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for removing silica in a Bayer process comprising the steps of:
    adding a promoter to an alumina process medium,
    forming silica based precipitates, and
    removing DSP from the alumina process medium, wherein the promoter is a composition of matter which comprises a silica dispersion or dry silica.

2. The method of claim 1 wherein the silica based precipitate is sodalite.

3. The method of claim 1 wherein the promoter is added to the desilication step of a Bayer process.

4. The method of claim 1 in which the promoter is blended with a DSP inhibitor.

5. The method of claim 1 in which the promoter has a particle size, the particle size being within a particle size range, the particle size range being from 2 nm to 200 nm.

6. The method of claim 1 in which the dosage of the promoter in the Bayer liquor is within a dosage range, the dosage range from 1 ppm to 10,000 ppm.

7. The method of claim 1 in which after the promoter is added to the Bayer liquor, the Bayer liquor is prevented from proceeding to a subsequent stage of the Bayer process for no more than 8 hours.

8. The method of claim 1 in which a seed solid is also added to the Bayer liquor.

9. The method of claim 8 in which the seed solid is undissolved DSP.

10. The method of claim 1 in which the promoter is doped with at least one item selected from the list consisting of:

metal, organic compounds, aluminum, cerium, titanium, tin, zirconium, zinc, copper, nickel, molybdenum, iron, rhenium, vanadium, boron, and any combination thereof.

11. The method of claim 10 in which the promoter further comprises a stabilizer selected from the list consisting of an amine, a quaternary compound, and any combination thereof.

12. The method of claim 11 in which the stabilizer is a quaternary amine that forms an alkaline solution when dispersed in water.

13. The method of claim 11 in which the stabilizer is a quaternary amine that includes a tetraalkyl ammonium ion wherein each alkyl group has a carbon chain length of 1 to 10, the alkyl groups being the same or different.

14. he method of claim 1 in which the silica is removed from the alumina process medium by precipitation.

15. The method of claim 1 in which the silica is removed from the alumina process medium by solid liquid separation.

16. The method of claim 1 in which the promoter is a boron-doped sodium borosilicate with a particle size of about 4 nm.

17. The method of claim 1 in which the promoter is stabilized by lithium, potassium, sodium, ammonium, or any combination thereof.

18. The method of claim 1 in which the promoter has a particle size, the particle size being within a particle size range, the particle size range being from 4 nm to 10 nm.

19. The method of claim 1 in which the dosage of the promoter in the Bayer liquor is of a dosage range, the dosage range being from 10 ppm to 100 ppm.

20. A method for removing silica in a Bayer process comprising the steps of:
 adding a promoter to an alumina process medium,
 forming silica based precipitates, and
 removing DSP from the alumina process medium, wherein the promoter comprises a chemical, the chemical selected from the list consisting of borosilicate, silica sol, fumed silica, silica fume, organo-silica sol, sodium silicates, boron doped colloidal silica, pozzolans, pozzolanic silicas, precipitated silica, polysilicates, and any combination thereof.

21. The method of claim 20 in Which the promoter further comprises an organic compound selected from the list consisting of: an amine, piperazine, tetramethylammonium hydroxide, amino propyl propanol amine, amino methyl ethanol amine, epoxy functional groups, ethyl propyl propanol amine, and any combination thereof.

* * * * *